United States Patent
Colley

(10) Patent No.: US 9,733,705 B2
(45) Date of Patent: Aug. 15, 2017

(54) APPARATUS, METHOD, COMPUTER PROGRAM AND USER INTERFACE

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 902 days.

(21) Appl. No.: 12/767,367

(22) Filed: Apr. 26, 2010

(65) Prior Publication Data

US 2011/0260842 A1  Oct. 27, 2011

(51) Int. Cl.
- *G06F 3/01* (2006.01)
- *G06F 3/041* (2006.01)
- *G06F 3/044* (2006.01)

(52) U.S. Cl.
CPC .............. *G06F 3/016* (2013.01); *G06F 3/044* (2013.01); *G06F 3/0414* (2013.01); *G06F 2203/014* (2013.01); *G06F 2203/04101* (2013.01)

(58) Field of Classification Search
USPC .............................. 340/407.1–407.2; 345/173
See application file for complete search history.

(56) References Cited

U.S. PATENT DOCUMENTS

| | | |
|---|---|---|
| 7,196,688 B2 | 3/2007 | Schena |
| 7,567,681 B2 | 7/2009 | Pelrine et al. |
| 7,952,566 B2 | 5/2011 | Poupyrev et al. |
| 8,378,798 B2 | 2/2013 | Bells et al. |
| 8,407,623 B2 | 3/2013 | Kerr et al. |
| 8,749,495 B2 | 6/2014 | Grant et al. |
| 8,954,887 B1 | 2/2015 | Tseng et al. |
| 9,387,395 B2 | 7/2016 | Rom et al. |
| 2002/0054060 A1 | 5/2002 | Schena |
| 2004/0017376 A1 | 1/2004 | Tagliabue et al. |
| 2004/0164971 A1 | 8/2004 | Hayward et al. |
| 2004/0169674 A1 | 9/2004 | Linjama |
| 2004/0216059 A1 | 10/2004 | Vong et al. |

(Continued)

FOREIGN PATENT DOCUMENTS

| | | |
|---|---|---|
| CN | 1678978 A | 10/2005 |
| EP | 1 575 069 B1 | 9/2005 |

(Continued)

OTHER PUBLICATIONS

International Search Report and Written Opinion for Application No. PCT/IB2011/051727 dated Aug. 17, 2011.

(Continued)

*Primary Examiner* — James Yang
(74) *Attorney, Agent, or Firm* — Alston & Bird LLP

(57) ABSTRACT

An apparatus, method, computer program and apparatus wherein the apparatus comprises: at least one processor: and at least one memory including computer program code; wherein the at least one memory and the computer program code are configured to, with the at least one processor, enable the apparatus to: provide a user selectable part; and configure the apparatus in either a first active state or a second active state wherein, in the first active state the user selectable part is actuated in response to a first mode of actuation and in the second active state the user selectable part is not actuated in response to the first mode of actuation; and configure the apparatus to provide a tactile indication when the apparatus is in the first active state that the user selectable part is actuated in response to the first mode of actuation.

20 Claims, 5 Drawing Sheets

(56) References Cited

U.S. PATENT DOCUMENTS

| | | | |
|---|---|---|---|
| 2005/0024341 A1 | 2/2005 | Gillespie et al. | |
| 2005/0030292 A1 | 2/2005 | Diederiks | |
| 2005/0057528 A1 | 3/2005 | Kleen | |
| 2005/0088417 A1 | 4/2005 | Mulligan | |
| 2005/0156904 A1 | 7/2005 | Katayose | |
| 2005/0168449 A1 | 8/2005 | Katayose | |
| 2006/0066569 A1 | 3/2006 | Eid et al. | |
| 2006/0103634 A1 | 5/2006 | Kim et al. | |
| 2007/0106457 A1 | 5/2007 | Rosenberg | |
| 2007/0140667 A1 | 6/2007 | Uchimura | |
| 2007/0152974 A1 | 7/2007 | Kim et al. | |
| 2007/0152982 A1 | 7/2007 | Kim et al. | |
| 2007/0236449 A1 | 10/2007 | Lacroix et al. | |
| 2007/0236450 A1 | 10/2007 | Colgate et al. | |
| 2007/0247420 A1 | 10/2007 | Strohband et al. | |
| 2007/0285402 A1 | 12/2007 | Lim et al. | |
| 2008/0010593 A1 | 1/2008 | Uusitalo et al. | |
| 2008/0024459 A1 | 1/2008 | Poupyrev et al. | |
| 2008/0143693 A1 | 6/2008 | Schena | |
| 2008/0303796 A1* | 12/2008 | Fyke | G06F 3/0236 345/173 |
| 2009/0002140 A1 | 1/2009 | Higa | |
| 2009/0007758 A1 | 1/2009 | Schlosser et al. | |
| 2009/0015560 A1 | 1/2009 | Robinson et al. | |
| 2009/0033617 A1 | 2/2009 | Lindberg et al. | |
| 2009/0075694 A1 | 3/2009 | Kim et al. | |
| 2009/0128376 A1 | 5/2009 | Caine et al. | |
| 2009/0128503 A1 | 5/2009 | Grant et al. | |
| 2009/0189873 A1 | 7/2009 | Peterson et al. | |
| 2009/0195861 A1 | 8/2009 | Jendbro et al. | |
| 2009/0250267 A1 | 10/2009 | Heubel et al. | |
| 2009/0303175 A1 | 12/2009 | Koivunen | |
| 2009/0315832 A1 | 12/2009 | Gray | |
| 2009/0322498 A1 | 12/2009 | Yun et al. | |
| 2010/0013653 A1 | 1/2010 | Birnbaum et al. | |
| 2010/0053078 A1 | 3/2010 | Kim et al. | |
| 2010/0060475 A1 | 3/2010 | Choi | |
| 2010/0079410 A1 | 4/2010 | Minton | |
| 2010/0088654 A1 | 4/2010 | Henhoeffer | |
| 2010/0097323 A1 | 4/2010 | Edwards et al. | |
| 2010/0141606 A1 | 6/2010 | Bae et al. | |
| 2010/0238114 A1* | 9/2010 | Vartanian | G06F 3/016 345/168 |

FOREIGN PATENT DOCUMENTS

| | | |
|---|---|---|
| EP | 2 073 508 A1 | 6/2009 |
| GB | 2 463 012 A | 3/2010 |
| TW | 200638238 A | 11/2006 |
| TW | 200937256 A | 9/2009 |
| WO | WO 03/050754 A1 | 6/2003 |
| WO | WO 2008/037275 A1 | 4/2008 |
| WO | WO 2009/097866 A1 | 8/2009 |
| WO | WO 2010/070604 A1 | 6/2010 |

OTHER PUBLICATIONS

Office Action for U.S. Appl. No. 12/767,344 dated Jul. 2, 2012.
International Search Report and Written Opinion for Application No. PCT/IB2011/051667 dated Aug. 9, 2011.
International Search Report and Written Opinion for Application No. PCT/IB2011/051695 dated Aug. 15, 2011.
Office Action for U.S. Appl. No. 12/767,344 dated Jan. 11, 2013.
Office Action for U.S. Appl. No. 12/767,344 dated Jun. 19, 2013.
Office Action for U.S. Appl. No. 12/767,344 dated Oct. 3, 2013.
Office Action for U.S. Appl. No. 12/767,344 dated Feb. 10, 2014.
Office Action for U.S. Appl. No. 12/767,344 dated Jun. 3, 2014.
Office Action for U.S. Appl. No. 12/767,344 dated Sep. 19, 2014.
Office Action for U.S. Appl. No. 12/767,349 dated Aug. 16, 2012.
Office Action for U.S. Appl. No. 12/767,349 dated Mar. 21, 2013.
Office Action for U.S. Appl. No. 12/767,349 dated Sep. 6, 2013.
Office Action for U.S. Appl. No. 12/767,349 dated Dec. 16, 2013.
Office Action for U.S. Appl. No. 12/767,349 dated Apr. 9, 2014.
Office Action for U.S. Appl. No. 12/767,349 dated Sep. 5, 2014.
Office Action for Canadian Application No. 2,797,340 dated Jun. 4, 2014.
Office Action for Taiwanese Application No. 100114280 dated Jun. 30, 2015.
Office Action for Chinese Application No. 201180021017.X dated Jul. 27, 2015.
Office Action and Search Report for Taiwanese Application No. 100114281 dated Jul. 1, 2015.
Office Action for Chinese Application No. 201180021017.X dated Dec. 17, 2014.
Office Action for U.S. Appl. No. 12/767,344 dated Feb. 6, 2015.
Office Action for U.S. Appl. No. 12/767,349 dated Jan. 9, 2015.
Office Action for U.S. Appl. No. 12/767,349 dated Dec. 21, 2016.
Office Action for U.S. Appl. No. 12/767,349 dated Nov. 20, 2015.
Office Action for Chinese Application No. 201180021017X dated Dec. 29, 2015.
Examiner's Answer for U.S. Appl. No. 12/767,344 dated Feb. 5, 2016.
Office Action for U.S. Appl. No. 12/767,349 dated Apr. 14, 2016.
Office Action for Chinese Application No. 201180021017.X dated Jun. 2, 2016.
Extended European Search Report for European Patent Application No. 11774505.9 dated Nov. 21, 2016, 6 pages.
Extended European Search Report for European Patent Application No. 11774507.5 dated Nov. 21, 2016, 8 pages.
Extended European Search Report for European Patent Application. No. 11774510.9 dated Nov. 21, 2016, 9 pages.
Notice of Allowance for U.S. Appl. No. 12/767,344 dated Mar. 16, 2017, 13 pages.
Notice of Allowance for U.S. Appl. No. 12/767,349, dated Jun. 20, 2017, 9 pages.
SemFeel: A User Interface with Semantic Tactile Feedback for Mobile Touch-Screen Devices [online] [retrieved May 12, 2017]. Retrieved from the Internet: <URL: http://iis-lab.org/paper/UIST2009.pdf>. 10 pages.
Notice of Allowance for U.S. Appl. No. 12/767,344 dated May 26, 2017, 2 pages.

* cited by examiner

APPARATUS, METHOD, COMPUTER PROGRAM AND USER INTERFACE

FIELD OF THE INVENTION

Embodiments of the present invention relate to an apparatus, method, computer program and user interface. In particular, they relate to an apparatus, method, computer program and user interface configured to be responsive to different types of user input.

BACKGROUND TO THE INVENTION

Apparatus comprising user input devices which may be actuated in response to different types of user input are well known. For instance a key of a key pad may be actuated in response to a short press, a long press or multiple short presses. Similarly a touch sensitive display may be actuated in response to a plurality of different modes of actuation including, for example, a short press, a long press, a multi touch input or a trace input.

BRIEF DESCRIPTION OF VARIOUS EMBODIMENTS OF THE INVENTION

According to various, but not necessarily all, embodiments of the invention there is provided an apparatus comprising: at least one processor: and at least one memory including computer program code; wherein the at least one memory and the computer program code are configured to, with the at least one processor, enable the apparatus to: provide a user selectable part; and configure the apparatus in either a first active state or a second active state wherein, in the first active state the user selectable part is actuated in response to a first mode of actuation and in the second active state the user selectable part is not actuated in response to the first mode of actuation; and configure the apparatus to provide a tactile indication when the apparatus is in the first active state that the user selectable part is actuated in response to the first mode of actuation.

In some embodiments of the invention the tactile indication may comprise an output which may be perceived by the user through the sense of touch. The tactile indication may comprise a raised portion of a user input device. The tactile indication may comprise an indented portion of a user input device.

In some embodiments of the invention the tactile indication may be provided by an electroactive polymer.

In some embodiments of the invention the tactile indication may comprise vibration of a part of the apparatus.

In some embodiments of the invention the first mode of actuation may comprise touching the user selectable part for longer than a predetermined time.

In some embodiments of the invention the first mode of actuation may comprise multiple touches of the user selectable part.

In some embodiments of the invention the tactile indication may be provided at the user selectable part.

In some embodiments of the invention the apparatus may be configured so that the tactile indication is not provided when the apparatus is configured in the second active state.

In some embodiments of the invention, when the apparatus is configured in the second active state the user selectable part may be actuated in response to a second mode of actuation.

In some embodiments of the invention the apparatus may be switched between the first active state and the second active state in response to a user input.

According to various, but not necessarily all, embodiments of the invention there is also provided a method comprising: providing a user selectable part of an apparatus; and configuring the apparatus in either a first active state or a second active state wherein, in the first active state the user selectable part is actuated in response to a first mode of actuation and in the second active state the user selectable part is not actuated in response to the first mode of actuation; and providing a tactile indication when the apparatus is in the first active state that the user selectable part is actuated in response to the first mode of actuation.

In some embodiments of the invention the tactile indication may comprise an output which may be perceived by the user through the sense of touch. The tactile indication may comprise a raised portion of a user input device. The tactile indication may comprise an indented portion of a user input device.

In some embodiments of the invention the tactile indication may be provided by an electroactive polymer.

In some embodiments of the invention the tactile indication may comprise vibration of a part of the apparatus.

In some embodiments of the invention the first mode of actuation may comprise touching the user selectable part for longer than a predetermined time.

In some embodiments of the invention the first mode of actuation may comprise multiple touches of the user selectable part.

In some embodiments of the invention the tactile indication may be provided at the user selectable part.

In some embodiments of the invention the apparatus may be configured so that the tactile indication is not provided when the apparatus is configured in the second active state.

In some embodiments of the invention, when the apparatus is configured in the second active state the user selectable part may be actuated in response to a second mode of actuation.

In some embodiments of the invention the apparatus may be switched between the first active state and the second active state in response to a user input.

According to various, but not necessarily all, embodiments of the invention there is also provided a computer program comprising computer program instructions that, when executed by at least one processor, enable an apparatus at least to perform: providing a user selectable part of the apparatus; and configuring the apparatus in either a first active state or a second active state wherein, in the first active state the user selectable part is actuated in response to a first mode of actuation and in the second active state the user selectable part is not actuated in response to the first mode of actuation; and providing a tactile indication when the apparatus is in the first active state that the user selectable part is actuated in response to the first mode of actuation.

In some embodiments of the invention there is also provided a computer program comprising program instructions for causing a computer to perform the method as described above.

In some embodiments of the invention there is also provided a physical entity embodying the computer program as described above.

In some embodiments of the invention there is also provided an electromagnetic carrier signal carrying the computer program as described above.

According to various, but not necessarily all, embodiments of the invention there is also provided a user interface comprising: a user input device comprising a user selectable part wherein when an apparatus is in a first active state the user selectable part is actuated in response to a first mode of actuation and when the apparatus is in a second active state the user selectable part is not actuated in response to the first mode of actuation; wherein the user input device is configured to provide a tactile indication when the apparatus is in the first active state that the user selectable part is actuated in response to the first mode of actuation.

In some embodiments of the invention the tactile indication may comprise an output which may be perceived by the user through the sense of touch.

According to various, but not necessarily all, embodiments of the invention there is also provided an apparatus comprising: means for providing a user selectable part of an apparatus; and means for configuring the apparatus in either a first active state or a second active state wherein, in the first active state the user selectable part is actuated in response to a first mode of actuation and in the second active state the user selectable part is not actuated in response to the first mode of actuation; and means for providing a tactile indication when the apparatus is in the first active state that the user selectable part is actuated in response to the first mode of actuation.

The apparatus may be for wireless communication.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
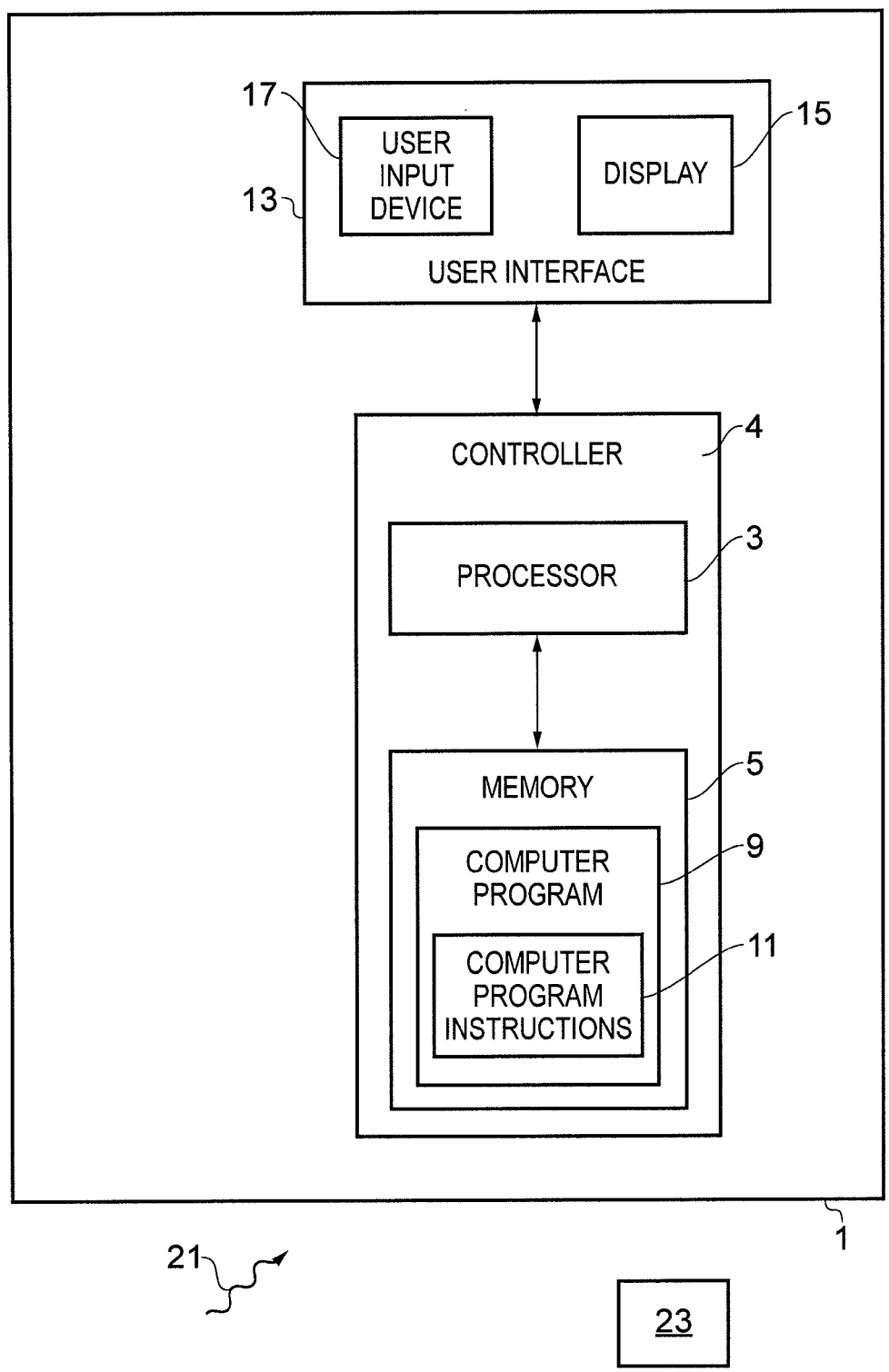
FIG. 1 schematically illustrates an apparatus according to an exemplary embodiment of the invention.

The Figures illustrate an apparatus 1 comprising: at least one processor 3: and at least one memory 5 including computer program code 11; wherein the at least one memory 5 and the computer program code 11 are configured to, with the at least one processor 3, enable the apparatus 1 to: provide a user selectable part 63; and configure the apparatus 1 in either a first active state or a second active state wherein, in the first active state the user selectable part 63 is actuated in response to a first mode of actuation and in the second active state the user selectable part 63 is not actuated in response to the first mode of actuation; and configure the apparatus 1 to provide a tactile indication when the apparatus 1 is in the first active state that the user selectable part 63 is actuated in response to the first mode of actuation.

FIG. 1 schematically illustrates an apparatus 1 according to an embodiment of the invention. The apparatus 1 may be an electronic apparatus. The apparatus 1 may be, for example, a mobile cellular telephone, a personal computer, a camera, a gaming device, a personal digital assistant, a personal music player or any other apparatus which enables a user to make user inputs to control the apparatus 1. The apparatus 1 may be a handheld apparatus 1 which can be carried in a user's hand, handbag or jacket pocket for example.

Only features referred to in the following description are illustrated in FIG. 1. However, it should be understood that the apparatus 1 may comprise additional features that are not illustrated. For example, in embodiments of the invention where the apparatus 1 is a mobile cellular telephone, the apparatus 1 may also comprise a transmitter and receiver configured to enable wireless communication.

The apparatus 1 illustrated in FIG. 1 comprises: a user interface 13 and a controller 4. In the illustrated embodiment the controller 4 comprises at least one processor 3 and at least one memory 5 and the user interface 13 comprises a display 15 and a user input device 17.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the Internet.

The controller 4 may also be configured to enable the apparatus 1 to provide a user selectable part 63 of the apparatus 1; and configure the apparatus 1 in either a first active state or a second active state wherein, in the first active state the user selectable part 63 is actuated in response to a first mode of actuation and in the second active state the user selectable part 63 is not actuated in response to the first mode of actuation; and provide a tactile indication when the apparatus 1 is in the first active state that the user selectable part 63 is actuated in response to the first mode of actuation The at least one processor 3 is configured to receive input commands from the user interface 13 and also to provide output commands to the user interface 13. The at least one processor 3 is also configured to write to and read from the at least one memory 5. The outputs of the user interface 13 are provided as inputs to the controller 4.

In the embodiment illustrated in FIG. 1 the user interface 13 comprises a user input device 17 and a display 15.

The user input device 17 may comprise any means which enables a user of the apparatus 1 to input information which may be used to control the apparatus 1. The user input device 17 may also enable a user to input information which may be stored in the one or more memories 5 of the apparatus 1. The user input device 17 may comprise a keypad or a portion of a touch sensitive display or a combination of a number of different types of user input devices.

The display 15 may comprise any means which enables information to be displayed to a user of the apparatus 1. The information may correspond to information which has been input by the user via the user input device 17, information which is stored in the one or more memories 5 or information which has been received by apparatus 1.

In some embodiments of the invention the user input device 17 and the display 15 may be combined to provide a touch sensitive display which both enables information to be displayed to a user and enables a user to make user inputs.

Figure 2:
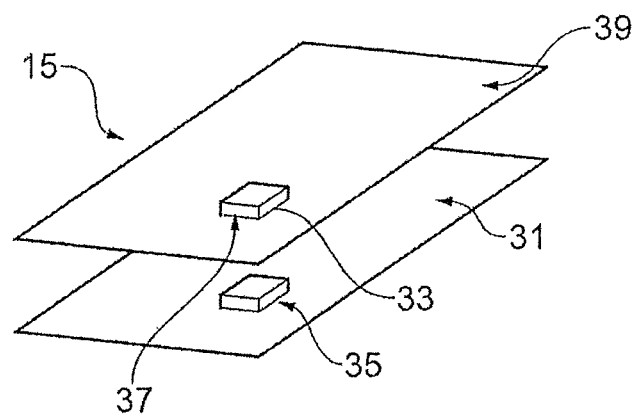
FIG. 2 illustrates a touch sensitive display configured to provide a tactile indication according to a first exemplary embodiment of the invention.
Figure 3:
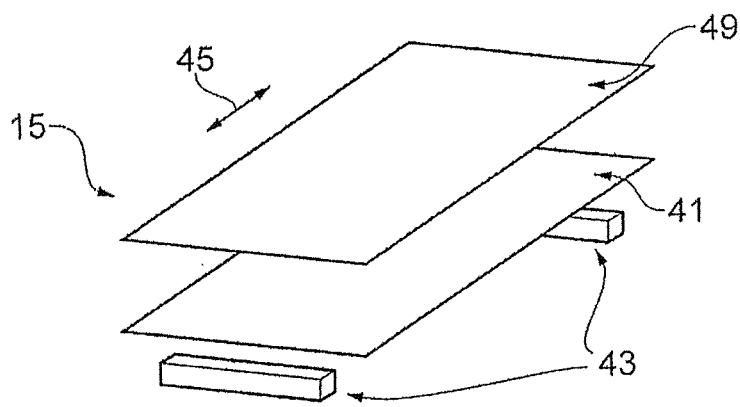
FIG. 3 illustrates a touch sensitive display configured to provide a tactile indication according to a second exemplary embodiment of the invention.

In embodiments of the invention the user interface 13 may also be configured to provide a tactile indication to a user. The tactile indication may comprise any output which the user may sense through touch. For example the tactile indication may comprise a raised portion or an indented portion of a touch sensitive display 15 or a change in the shape of a key of a user input device 17. In some embodiments of the invention the tactile indication may comprises a vibration of a part of the apparatus 1. Examples of tactile indications are illustrated in FIGS. 2 and 3.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIG. 5. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for providing a user selectable part 63 of the apparatus 1; means for configuring the apparatus 1 in either a first active state or a second active state wherein, in the first active state the user selectable part 63 is actuated in response to a first mode of actuation and in the second active state the user selectable part 63 is not actuated in response to the first mode of actuation; and providing a tactile indication when the apparatus is in the first active state that the user selectable part 63 is actuated in response to the first mode of actuation.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 2 illustrates a touch sensitive display 15 configured to provide a tactile indication 31 according to an embodiment of the invention. The touch sensitive display 15 comprises a flexible surface layer 39. The flexible surface layer 39 may comprise part of the outer surface of the apparatus 1. The flexible surface layer 39 may be actuated by a user. The actuation may comprise a user touching the flexible surface layer 39 with a user input device such as their finger or a stylus.

In the embodiment illustrated in FIG. 2 an electroactive polymer (EAP) layer 31 is provided underneath the flexible surface layer 39. The electroactive polymer may comprise any material which changes shape when a voltage is applied to it. The EAP layer 31 may be configured to provide localized changes in topology. That is, the EAP layer 31 may be configured so that a first portion of the EAP layer 31 is raised or lowered with respective to the other portions of the EAP layer 31. The EAP layer 31 may be provided as a grid of EAP elements. The voltage across the EAP layer may be controlled by the controller 4 thereby enabling the controller 4 to control the topology of the EAP layer 31. The controller 4 may control when the topology of the EAP layer 31 is changed.

The EAP layer 31 is positioned underneath the flexible surface layer 39 so that any change in the topology of the EAP layer 31 causes a corresponding change in the topology of the flexible surface layer 39.

In the embodiment illustrated in FIG. 2 a voltage has been applied to a first portion 35 of the EAP layer 31. This has caused the first portion 35 to become raised with respect to the rest of the EAP layer 31 so that the first portion 35 comprises a projection. The projection in the first portion 35 of the EAP layer 31 also deforms the flexible surface layer 39 so that a corresponding projection 37 is provided in a first portion 33 of the flexible surface layer 39 overlaying the first portion 35 of the EAP layer 31. A user can feel the projection when they touch the flexible surface layer 39 so the projection 37 may be used to provide a tactile indication to a user.

FIG. 3 illustrates a touch sensitive display 15 configured to provide a tactile indication according to another embodiment of the invention. In this embodiment of the invention the touch sensitive display 15 comprises a surface layer 49. As in the previous embodiment the surface layer 49 may comprise part of the outer surface of the apparatus 1 and may be actuated by a user. The actuation may comprise a user touching the surface layer 49 with a user input device such as their finger or a stylus or by bringing the user input device into close proximity with the surface layer 49. In this particular embodiment the surface layer 49 may or may not be flexible.

A proximity sensing layer 41 is provided underneath the surface layer 49. The proximity sensing layer 41 is configured to detect when a user brings a user input device close to the surface layer 49. The proximity sensing layer 41 may comprise any means which enables the user input device to be detected, for example, it may comprise capacitive sensors of infrared emitters and sensors. The proximity sensing layer 41 may also be configured to detect which portion of the surface layer 49 the user has brought the user input device into proximity with and provide a corresponding output signal to the controller 4.

One or more vibration modules 43 are provided underneath the force sensing layer 41. In this particular embodiment the vibration modules 43 are configured to cause the surface layer 49 and the proximity sensing layer 41 to vibrate back and forwards in the directions indicated by the arrow 45. The movement of the surface layer 49 may be felt by the user of the apparatus 1 and so the vibration may be used to provide a tactile indication to the user.

The vibration modules 43 may be controlled by the controller 4. The controller 4 may be configured to enable the vibration modules 43 to vibrate in dependence upon the signal received from the proximity sensing layer 41. For example when the proximity sensing layer 41 detects that a user input device is in proximity with a particular region of the surface layer 49 the controller may enable the vibration modules 43 to vibrate in response to this detection.

Figure 4:
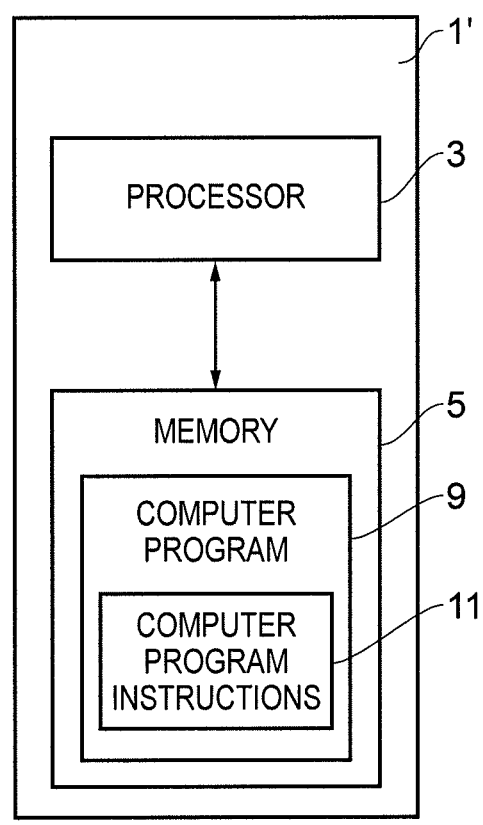
FIG. 4 schematically illustrates an apparatus according to another exemplary embodiment of the invention.

FIG. 4 illustrates an apparatus 1' according to another embodiment of the invention. The apparatus 1' illustrated in FIG. 4 may be a chip or a chip-set. The apparatus 1' comprises at least one processor 3 and at least one memory 5 as described above in relation to FIG. 1.

Figure 5:
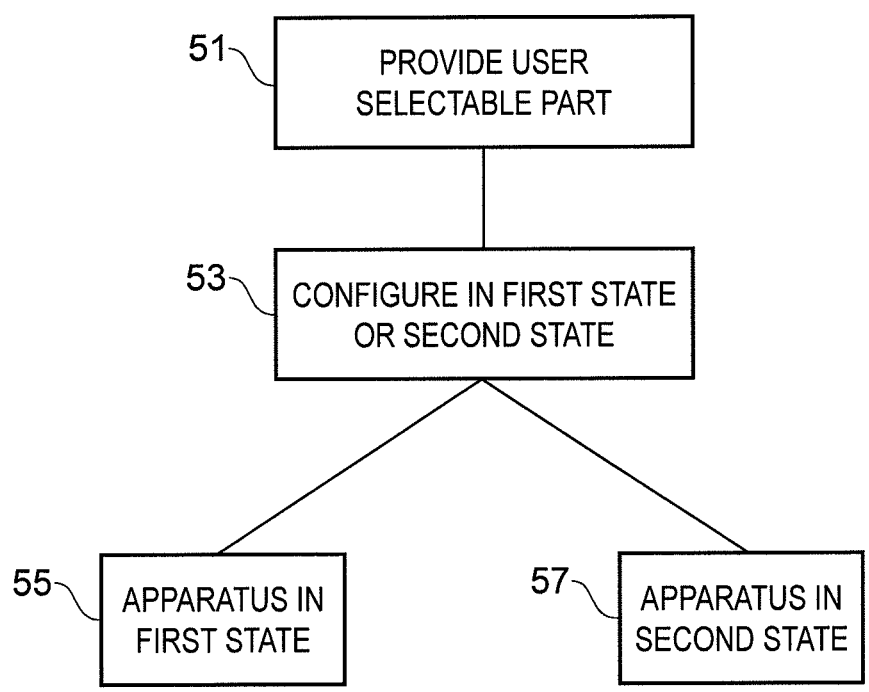
FIG. 5 is a block diagram which schematically illustrates a method according to an exemplary embodiment of the invention.

A method of controlling the apparatus 1, according to embodiments of the invention, is illustrated schematically in FIG. 5.

At block 51 a user selectable part 63 is provided. The user selectable part 63 may comprise any part of a user input device 13 which may be actuated and in response to the actuation provide a control signal to the controller 4. A plurality of user selectable parts 61, 63, 65 may be provided simultaneously. The user selectable parts 61, 63, 65 may comprise portions of a touch sensitive display 15 which may be actuated by a user. In other embodiments of the invention the user selectable parts 61, 63, 65 may comprise a key or a plurality of keys in a key pad.

At block 53 the apparatus 1 is configured either in a first active state or a second active state. The active states may be any states in which the apparatus 1 is operable to perform functions. For example, in embodiments of the invention where the apparatus 1 is a mobile telephone the states may be a state in which the user may make or receive a telephone call or access other applications of the telephone such as a phonebook function or camera function.

In the first active state the user selectable part 63 is actuated in response to a first mode of actuation whereas in the second active state the user selectable part 63 is not actuated in response to the first mode of actuation. For example, in the first active state the user selectable part 63 may be actuated by a first type of input so that, in response to the detection of the first type of input, the controller 4 controls the apparatus 1 to perform a first function. Whereas in the second active state, if the user makes the first type of input in the user selectable part 63 no function is performed.

The first type of input may comprise, for example, a long press, in which the user touches the user selectable part 63 for longer than a predetermined period of time. In other embodiments of the invention the first type of input may comprise a double actuation in which the user makes two or more touches of the user selectable part 63 within a predetermined time period. In other embodiments of the invention the first type of input may comprise a trace input in which a user touches the surface of a touch sensitive display 15 with a user input device and then drags the user input device across the surface of the touch sensitive display 15. The trace may begin or end on the user selectable part 63.

In some embodiments of the invention the user selectable part 63 may also be actuated in response to a second type of input when the apparatus 1 is in the first active state. The second type of input may be different to the first type of input. In some embodiments of the invention the second type of input may comprise a short press in which the user touches the user selectable part 63 for less than a predetermined period of time.

When the user actuates the user selectable part 63 using the second type of input the controller 4 controls the apparatus 1 to perform a second function. The second function may be different to the first function.

When the apparatus 1 is configured in the second active state the user selectable part 63 may still be actuated by the second type of input to enable the controller 4 to perform a function.

The apparatus 1 may be configured in either the first active state or the second active state in response to a user input. For example, a user may configure the apparatus 1 in either the first active state or the second active state by selecting an item from a menu. The apparatus 1 may be switched between the two states.

At block 55 the apparatus 1 has been configured in the first active state so that the user selectable part 63 is actuated in response to a first mode of actuation. The controller 4 determines that the apparatus 1 is in the first active state and controls the user interface to provide a tactile indication that the user selectable part 63 may actuated in response to a first mode of actuation.

In embodiments of the invention where the user interface 13 comprises a touch sensitive display 15 with an EAP layer 31, as illustrated in FIG. 2, the controller 4 may control the voltage across the EAP layer 31 to change the localized topology of the EAP layer 31 and flexible surface layer 39. The change in the topology may comprise a projection 37 as illustrated in FIG. 2. The projection 37 provides a tactile indication which the user feels when they touch the touch sensitive display. In other embodiments of the invention the change in the topology may comprise an indentation rather than a projection. The tactile indication may be provided at the user selectable part 63 so that the projection 37 or the indentation is provided in the same area of the touch sensitive display 15 as the user selectable part 63.

In other embodiments of the invention the tactile indication may comprise vibration of the apparatus 1 as illustrated in FIG. 3. The vibration may be triggered whenever the force sensing layer 41 detects that the user has brought their user input device into proximity of the user selectable part 63 thereby providing an indication that a first mode of actuation is available at that user selectable part 63.

At block 57 the apparatus 1 has been configured in the second active state so that the user selectable part 63 is not actuated in response to the first mode of actuation. The controller 4 determines that the apparatus 1 is in the second active state and controls the user interface 13 so that no tactile indication is provided in respect of the user selectable part 63. The surface of the touch sensitive display 15 does not have any projection or indentation associated with the user selectable part 63 and is not configured to vibrate when the user brings a user input device into proximity with the user selectable part 63.

Figure 6A:
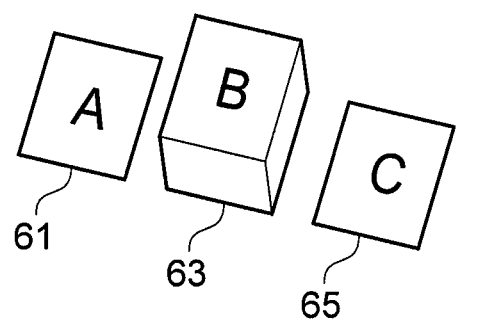
FIGS. 6A to 6B illustrate an exemplary embodiment of the invention in use.
Figure 6B:
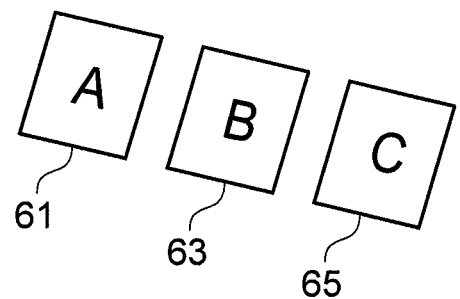

FIGS. 6A and 6B illustrate an exemplary embodiment of the invention where the tactile indication is provided by an EAP layer 31 as illustrated in FIG. 2.

FIG. 6A illustrates an embodiment of the invention in a first active state. In the embodiment illustrated in FIG. 6A three user selectable parts 61, 63, 65 are provided. The user selectable parts 61, 63, 65 are three distinct regions on a touch sensitive display 15. One of the user selectable parts 63 is actuated in response to a first mode of actuation and so a projection 37 is provided in the region of the touch sensitive display 15 in which the user selectable part 63 is displayed to indicate this. The other user selectable parts 61, 65 are not actuated in response to the mode of actuation and so there are no projections or indentations provided in the region of the touch sensitive display 15 in which the other user selectable parts 61, 65 are displayed. It is to be appreciated that the other user selectable parts 61, 65 may be actuated in response to a second mode of actuation.

When the apparatus 1 is switched between the first active state and the second active state the controller 4 may control the voltage across the EAP layer 31 to change the topology of the EAP layer 31 and the flexible surface layer 39.

FIG. 6B illustrates an embodiment of the invention in a second active state. In the embodiment illustrated in FIG. 6B none of the three user selectable parts 61, 63, 65 are actuated in response to the first mode of actuation and so there are no projections or indentation provided in the region of the touch sensitive display 15 in which the user selectable parts 61, 63, 65 are displayed. The controller 4 controls the voltage across the EAP layer 31 so that the flexible surface layer 39 is substantially flat with no projections or indentations which would be felt by the user.

Embodiments of the invention enable a tactile indication to be provided to a user whenever a user selectable part 63 may be actuated in response to a particular mode of actuation. This provides a convenient way of making a user aware that the particular mode of actuation is available. It enables a user to clearly distinguish between different active states of the apparatus 1 and also the different user selectable parts 63 without requiring any additional information to be presented on a display 15.

Also, in some embodiments of the invention the tactile indication which is provided may make the apparatus 1 more intuitive for the user to use. For example, where the user selectable part 63 is responsive to a long press the tactile indication may be a projection. This may prompt the user to make a long press as they may feel that the projection should be pressed in.

In some embodiments of the invention different types of tactile indication may be associated with different types of input. This may enable a user to clearly determine the modes of actuation that are available.

The blocks illustrated in the FIG. 5 may represent operations in a method and/or sections of code in the computer program 9. The illustration of a particular order to the blocks does not necessarily imply that there is a required or preferred order for the blocks and the order and arrangement of the blocks may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example in the illustrated embodiments the user input device comprises a touch sensitive display. It is to be appreciated that in other embodiments of the invention the user input device may comprise one or more keys in a key pad and the tactile indication could be a change in shape of a key or a vibration of a key.

It is to be appreciated that any suitable means may be used to provide a tactile indication to the user. The means may be localized so that they produce a change on the way a portion of the apparatus feels or they may be global so they change the way the whole apparatus feels. In the above described embodiment the localized projections or indentations are provided by an EAP layer. In other embodiments of the invention the localized projections may be provided by any other suitable means such as a mechanical or fluid pumping system or a piezo electric transducer.

In some embodiments of the invention the apparatus may be configured so that the tactile indication changes as the user selectable part is actuated. For example, where the tactile indication is a projection the projection may change as the user touches the projection. In some embodiments of the invention the resistance to being pressed may change so that it becomes harder for the user to press the projection. In other embodiments of the invention the size and/or shape of the projection may change as the user selectable part is actuated.

In some embodiments of the invention the tactile indication may also depend on the context of the apparatus. The first mode of actuation may only be available when predetermined context criteria are satisfied. For example where the user selectable part is associated with a set of contact information first mode of actuation and the associated tactile indication may be provided whenever the contact is available for an instant messaging service. This provides the user with a tactile indication of the context of the apparatus.

In other embodiments of the invention the user selectable part may be part of a hierarchical menu or folder structure. The first mode of actuation and the associated tactile indication may be provided whenever there is another menu or folder level beneath the current level. For example where the menu structure comprises a plurality of folders, if there are one or more files or sub-folders within a folder the tactile indication may be provided whereas if no files or sub-folders are within the folder the tactile indication might not be provided. This provides the user with a clear indication of whether or not there are any files stored in a folder without having to access the folder.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising: at least one processor; and at least one memory including computer program code; the at least one memory and the computer program code are configured to, with the at least one processor, cause the apparatus to:

determine that the apparatus is in one of a first active state or a second active state;

provide a user selectable part;

respond to actuation of the user selectable part in response to a first mode of actuation when the apparatus is in the first active state, and differently respond to actuation of the user selectable part in response to a second mode of actuation when the apparatus is in the second active state; and configure the apparatus to cause a tactile indication to be provided with the user selectable part in response to the first mode of actuation and not in response to the second mode of actuation.

2. An apparatus as claimed in claim 1 wherein the tactile indication is configured to be perceived by the user through the sense of touch.

3. An apparatus as claimed in claim 1 wherein the tactile indication comprises a raised portion of a user input device.

4. An apparatus as claimed in claim 1 wherein the tactile indication comprises an indented portion of a user input device.

5. An apparatus as claimed in claim 1 wherein the tactile indication is provided by an electroactive polymer.

6. An apparatus as claimed in claim 1 wherein the tactile indication comprises vibration of a part of the apparatus.

7. An apparatus as claimed in claim 1 wherein the first mode of actuation comprises enabling the user selectable part for pressing longer than a predetermined period of time.

8. An apparatus as claimed in claim 1 wherein the first mode of actuation comprises enabling multiple touches of the user selectable part.

9. An apparatus as claimed in claim 1 wherein the apparatus is configured to be switched between the first active state and the second active state in response to a user input.

10. A method comprising:
  determining that an apparatus is in one of a first active state or a second active state;
  providing a user selectable part of the apparatus;
  responding to actuation of the user selectable part in response to a first mode of actuation when the apparatus is in the first active state, and differently responding to actuation of the user selectable part in response to a second mode of actuation when the apparatus is in the second active state; and
  causing a tactile indication to be provided with the user selectable part in response to the first mode of actuation and not in response to the second mode of actuation.

11. A method as claimed in claim 10 wherein the tactile indication is configured to be perceived by the user through the sense of touch.

12. A method as claimed in claim 10 wherein the tactile indication comprises a raised portion of a user input device.

13. A method as claimed in claim 10 wherein the tactile indication comprises an indented portion of a user input device.

14. A method as claimed in claim 10 wherein the tactile indication is provided by an electroactive polymer.

15. A tangible computer program product comprising at least one computer-readable storage medium having computer program instructions stored therein that, when executed by at least one processor, cause an apparatus at least to perform:
  determining that an apparatus is in one of a first active state or a second active state;
  providing a user selectable part of the apparatus;
  responding to actuation of the user selectable part in response to a first mode of actuation when the apparatus is in the first active state, and differently responding to actuation of the user selectable part in response to a second mode of actuation when the apparatus is in the second active state; and
  causing a tactile indication to be provided with the user selectable part in response to the first mode of actuation and not in response to the second mode of actuation.

16. An apparatus as claimed in claim 1 wherein the second mode of actuation comprises enabling the user selectable part for pressing less than a predetermined period of time.

17. An apparatus as claimed in claim 1 further comprising a touch sensitive display, wherein the user selectable part and the tactile indication are provided on the touch sensitive display.

18. An apparatus as claimed in claim 1 wherein the tactile indication provided with the user selectable part causes the user selectable part to have a first shape in response to the first mode of actuation, and the user selectable part has a second shape in response to the second mode of actuation as the tactile indication is not provided in response to the second mode of actuation.

19. A method as claimed in claim 10 wherein the tactile indication provided with the user selectable part causes the user selectable part to have a first shape in response to the first mode of actuation, and the user selectable part has a second shape in response to the second mode of actuation as the tactile indication is not provided in response to the second mode of actuation.

20. A computer program product as claimed in claim 15 wherein the tactile indication provided with the user selectable part causes the user selectable part to have a first shape in response to the first mode of actuation, and the user selectable part has a second shape in response to the second mode of actuation as the tactile indication is not provided in response to the second mode of actuation.

\* \* \* \* \*